(12) United States Patent
Lerner et al.

(10) Patent No.: US 7,695,146 B2
(45) Date of Patent: Apr. 13, 2010

(54) PROJECTION ASSEMBLY

(75) Inventors: Scott Lerner, Corvallis, OR (US);
Anurag Gupta, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1101 days.

(21) Appl. No.: 11/257,929

(22) Filed: Oct. 24, 2005

(65) Prior Publication Data

US 2007/0091410 A1    Apr. 26, 2007

(51) Int. Cl.
G03B 21/14    (2006.01)

(52) U.S. Cl. .................... 353/121; 353/122; 353/69; 353/97

(58) Field of Classification Search ............. 353/30, 353/69, 70, 121, 122, 100; 349/5, 7, 8, 9
See application file for complete search history.

(56) References Cited

U.S. PATENT DOCUMENTS

| | | | |
|---|---|---|---|
| 5,257,134 A | 10/1993 | Sugawara | |
| 5,302,983 A * | 4/1994 | Sato et al. | 353/69 |
| 5,422,691 A * | 6/1995 | Ninomiya et al. | 353/69 |
| 5,442,413 A * | 8/1995 | Tejima et al. | 353/69 |
| 5,597,222 A * | 1/1997 | Doany et al. | 353/33 |
| 5,745,297 A | 4/1998 | Kaneko et al. | |
| 5,969,875 A | 10/1999 | Sugawara | |
| 6,188,524 B1 | 2/2001 | Hayashi et al. | |
| 6,317,171 B1 | 11/2001 | Dewald | |
| 6,585,378 B2 | 7/2003 | Kurtz et al. | |
| 6,683,728 B2 * | 1/2004 | Kohler et al. | 359/649 |
| 6,704,065 B1 | 3/2004 | Sharp et al. | |
| 6,758,565 B1 | 7/2004 | Cobb et al. | |
| 6,761,457 B2 * | 7/2004 | Wada et al. | 353/70 |
| 6,808,269 B2 | 10/2004 | Cobb | |
| 6,817,722 B1 | 11/2004 | Cole et al. | |
| 7,175,287 B2 * | 2/2007 | Gohman | 353/79 |
| 2003/0137744 A1 | 7/2003 | Kuwa et al. | |
| 2004/0190716 A1 | 9/2004 | Nelson | |

FOREIGN PATENT DOCUMENTS

| | | |
|---|---|---|
| EP | 1 422 543 A1 | 5/2004 |
| EP | 1 524 862 A | 4/2005 |
| WO | WO 00/67059 A1 | 11/2000 |

* cited by examiner

*Primary Examiner*—William C Dowling

(57) ABSTRACT

A projection assembly is provided herein. According to one exemplary embodiment, the projection assembly includes a modulator assembly, the modulator including at least one modulator panel, a projection lens assembly including a first projection lens sub-assembly in optical communication with the modulator assembly, the first projection lens sub-assembly being configured to form a virtual modulator, the virtual modulator corresponding to the output of the modulator assembly focused at a single plane.

21 Claims, 5 Drawing Sheets

PROJECTION ASSEMBLY

BACKGROUND

A conventional system or device for displaying an image, such as a television monitor, projector, or other imaging system, is frequently used to display a still or video image. Viewers evaluate display systems based on many criteria such as image size, contrast ratio, color purity, brightness, pixel color accuracy, and resolution. Image brightness, pixel color accuracy, and resolution are particularly important metrics in many display markets because the available brightness, pixel color accuracy, and resolution can limit the size of a displayed image and control how well the image can be seen in venues having high levels of ambient light.

Many digital display systems create an image with one or more modulator panels. In particular, modulator panels modulate light that is incident thereon to form an image or sub-image. Multiple modulator panels may be used to create a higher quality image. In such systems, multiple components, such as beam splitters, total internal reflection prisms, and color combiners, to name a few, are used to direct light to and from each of the modulator panels. The number of such components present frequently increases as the number of modulator panels increases. As light is directed to each of these components, a small portion of the light diverges from the intended path. If this light, referred to as stray light, reaches the screen it mixes with the modulated light. The mixing of the stray light with the modulated light reduces the contrast of the displayed image.

In addition to transmitting some amount of stray light, the presence of multiple components frequently constrains the back focal distance of the display optics. In particular, the location of the display optics is frequently selected to accommodate other components while remaining in communication with the modulator panel or panels.

SUMMARY

A projection assembly is provided herein. According to one exemplary embodiment, the projection assembly includes a modulator assembly, the modulator including at least one modulator panel, a projection lens assembly including a first projection lens sub-assembly in optical communication with the modulator assembly, the first projection lens sub-assembly being configured to form a virtual modulator, the virtual modulator corresponding to the output of the modulator assembly focused at a single plane.

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the disclosure.

Throughout the drawings, identical reference numbers designate similar, but not necessarily identical, elements.

DETAILED DESCRIPTION

Several projection assemblies are discussed herein for use in display systems. According to several exemplary embodiments, the projection assemblies produce a virtual modulator adjacent to the final projection lens assembly in the projection assembly. A virtual modulator represents the output of the entire projection assembly focused at a single plane. The virtual modulator may allow for substantial design freedom in selecting the characteristics and location of the final projection lens assembly. For example, a back focal distance and/or zoom characteristics of the final projection lens assembly may be selected to optimize the final image, rather than accommodate components near the optical path between the modulator panel or panels and the final projection lens assembly. Additionally, the virtual modulator may allow for the placement of a field stop near or adjacent to a modulator plane, thereby reducing or minimizing stray light that passes through the field stop. Further, the image at the virtual modulator plane may be conditioned as desired. For example, the image at the virtual modulator may be pre-corrected to compensate for aberrations in final projection lens sub-assemblies, such as short-throw type projection lenses.

In the following description, for purposes of explanation, numerous specific details are set forth in order to provide a thorough understanding of the present method and apparatus. It will be apparent, however, to one skilled in the art, that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Display System

Figure 1:
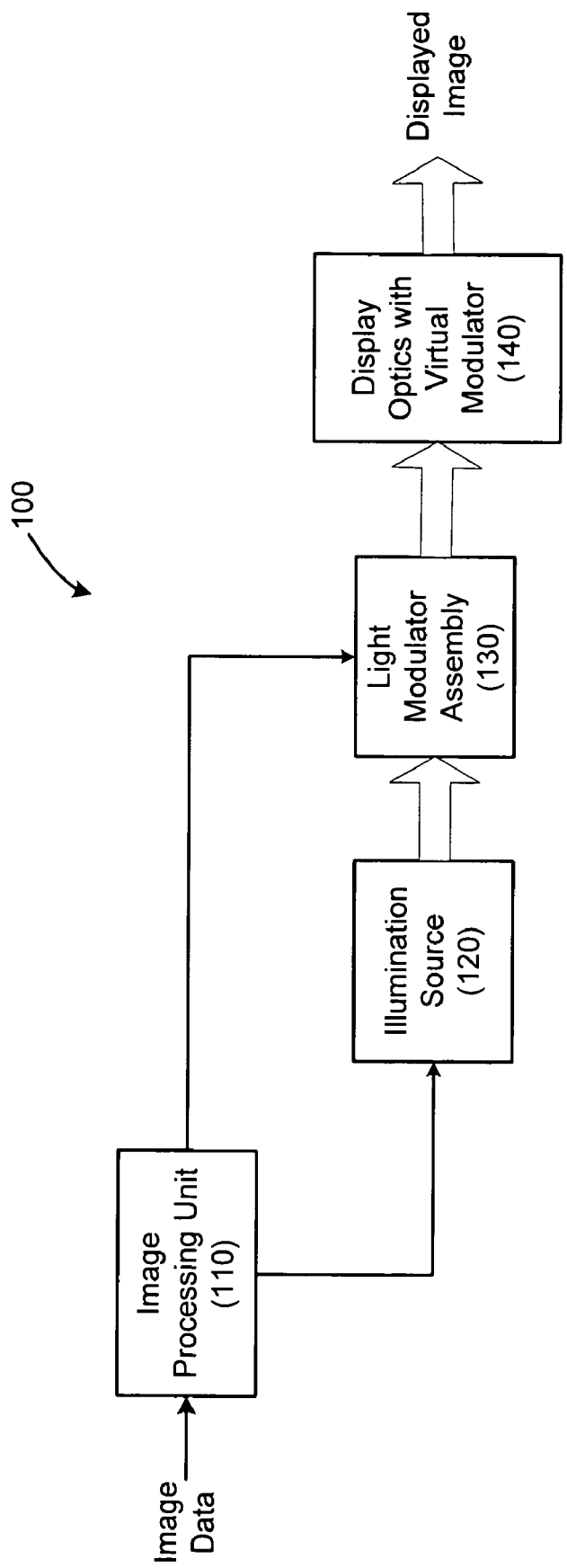
FIG. 1 illustrates a display system according to one exemplary embodiment.

FIG. 1 illustrates an exemplary display system (100). The components of FIG. 1 are exemplary only and may be modified or changed as best serves a particular application. As shown in FIG. 1, image data is input into an image processing unit (110). The image data defines an image that is to be displayed by the display system (100).

While one image is illustrated and described as being processed by the image processing unit (110), it will be understood by one skilled in the art that a plurality or series of images may be processed by the image processing unit (110). The image processing unit (110) performs various functions including controlling an illumination source (120) and a light modulator assembly (130).

The display system (100) also includes an illumination source (120). The illumination source (120) produces the light to be used by the display system (100). This light is directed to the light modulator assembly (130). The incident light directed to the modulator assembly (130) may be modulated in its frequency, phase, intensity, polarization, or direction by the modulator assembly (130). For example, according to one exemplary embodiment, the light produced by the illumination source (120) is split into two or more component beams and directed to the modulator assembly (130). The modulator assembly (130) according to such an exemplary embodiment includes multiple modulator panels which each modulate a component beam directed thereto to form a sub-image. These sub-images may be combined to form a single full-color image. This full-color image is directed to display optics (140).

The display optics (140) may include any device configured to display or project an image. For example, according to one exemplary embodiment, the display optics (140) include, but are not limited to, a plurality of lens assemblies in optical communication with each light modulator assembly. The display optics also includes a virtual modulator. The virtual modulator is a full-color image of the modulator assembly (130). It may be substantially the same size and shape of the modulator panel or panels of the modulator assembly (130). The virtual modulator may also be a magnification of the modulator panel or panels. For example, if the modulator assembly (130) includes a plurality of modulator panels, the virtual modulator is a single, combined full-color image of the correct size and aspect ratio of the modulator panels formed within the display optics (140). Thus, the virtual modulator substantially represents the equivalent of the complete modulator assembly focused at a plane.

As will be discussed in more detail below, the display optics also include a second projection lens assembly. The virtual modulator assembly may allow for design freedoms for the second projection lens assembly, such as relatively short back focal distance for the second projection lens assembly and for a field stop. The second projection lens assembly directs the output of the virtual modulator to a viewing surface. The viewing surface may be, but is not limited to, a screen, television such as a rear projection-type television, wall, liquid crystal display (LCD), or computer monitor.

Method of Modulating Light

Figure 2:
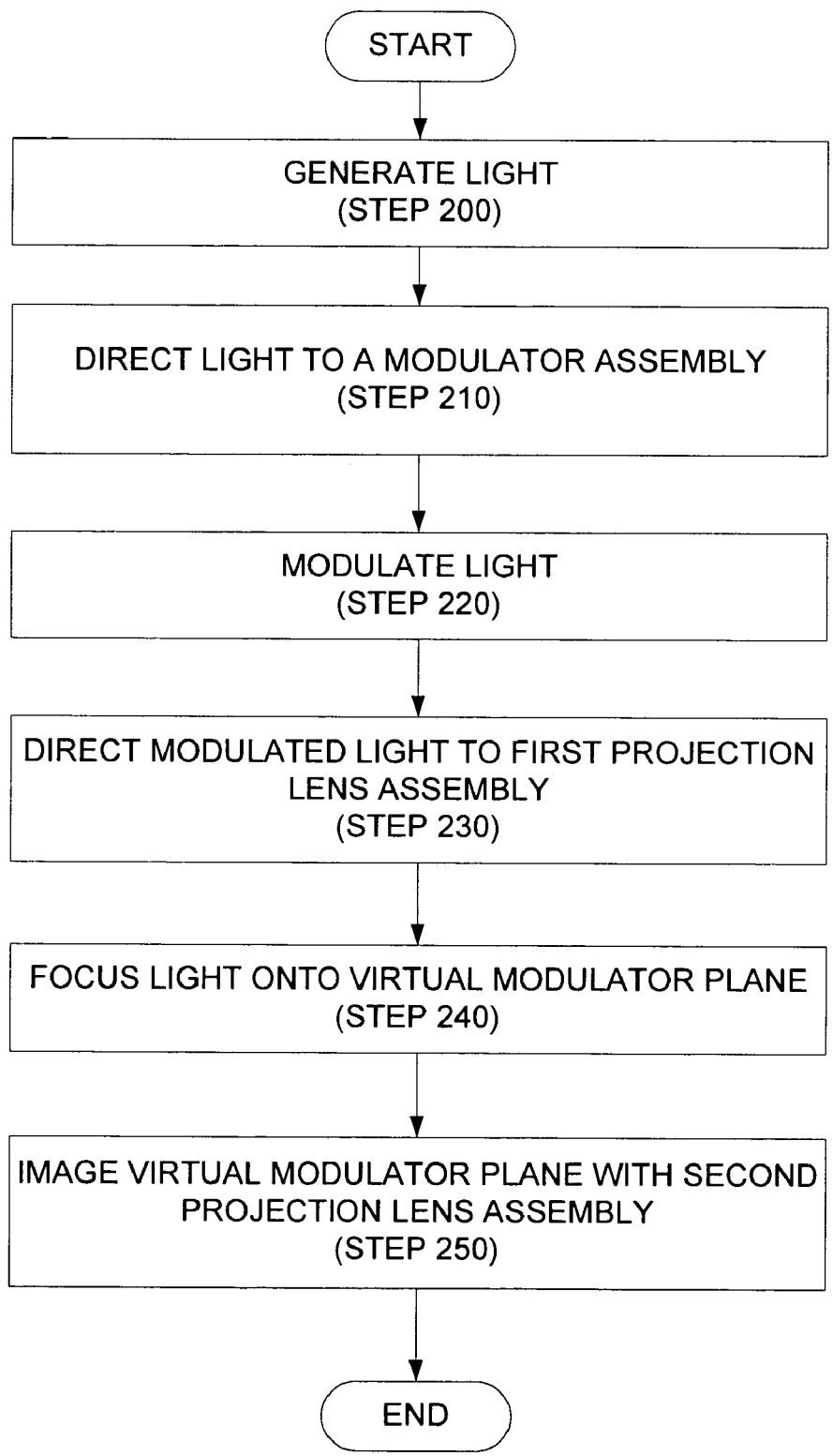
FIG. 2 is a flowchart illustrating a method of modulating light according to one exemplary embodiment.

FIG. 2 is a flowchart illustrating a method of modulating light according to one exemplary embodiment. The method begins by generating light (step 200). For example, light may be generated by a light source module. Suitable light may include multi-component light, such as white light or sequentially varying light.

The light is directed to the light modulator assembly (step 210). According to one exemplary embodiment, the light modulator assembly includes a single modulator panel. According to other exemplary embodiments, the light modulator assembly includes multiple light modulator panels.

In either case, light directed to the light modulator assembly is modulated (step 220). For example, light incident on the light modulator assembly may be modulated in terms of color, frequency, intensity, hue, or other characteristics. By modulating the characteristics of the light, the light modulator assembly is able to form full-color images, as will be described in more detail below.

The output of the light modulator assembly, or modulated light (220), is directed from the light modulator assembly to a projection lens assembly (step 230). In particular, according to one exemplary method, the light is directed to a first section of a first projection lens sub-assembly. The first segment directs the light to a second segment.

The entrance dimensions of the second section define a pupil plane for the final image that is to be displayed. As the modulated light is passed through the second section, the second section focuses the light onto a virtual modulator plane (step 240). The first and second segment work together to image the modulator assembly. Wave front aberrations that the first segment of the projection lens introduces are compensated by the second segment of the projection lens. For example, the virtual modulator image of the modulator assembly may have chromatic aberration that is introduced by the first segment of the projection lens and compensated by the second segment.

The virtual modulator plane, according to one exemplary embodiment, corresponds to the image to be displayed. For example, focusing light onto the virtual modulator plane (step 240) may include combining individual sub-images from different light modulator panels to form a single image. According to other exemplary embodiments, the individual sub-images may be combined before they are directed to the first projection lens sub-assembly. In either case, a virtual modulator is formed at the virtual modulator plane. The virtual modulator is a single combined image of the same ratio as the each modulator panels in the modulator assembly.

A second projection lens sub-assembly then images the virtual modulator (step 250). For example, according to one exemplary embodiment, as the second projection lens sub-assembly images the virtual modulator (step 250), the second projection lens sub-assembly magnifies and focuses the image while directing the image to the display surface. The virtual modulator allows design freedom for the second projection lens sub-assembly. Exemplary projection assemblies will now be discussed in more detail.

Projection Assembly

Figure 3:
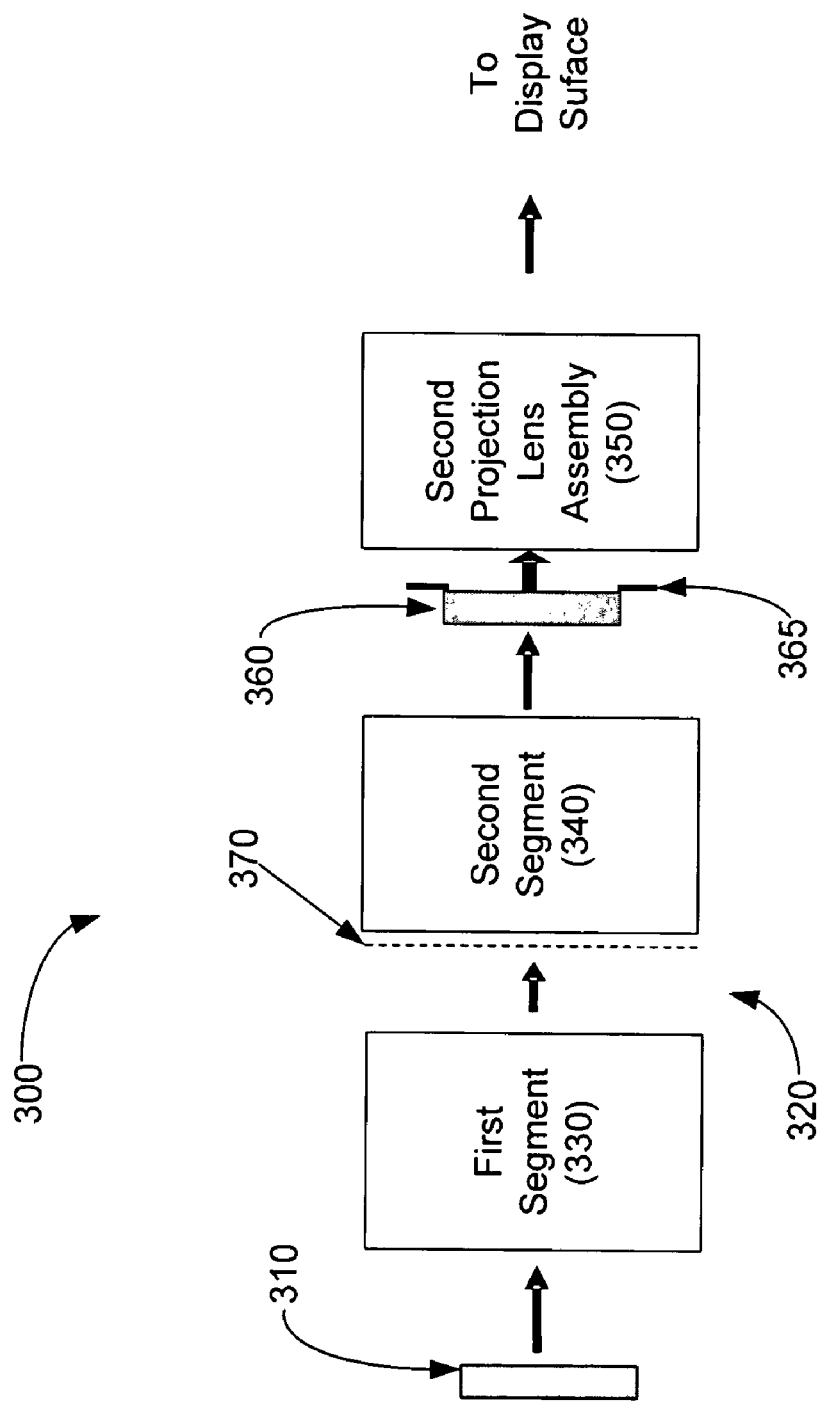
FIG. 3 illustrates a projection assembly according to one exemplary embodiment.

FIG. 3 illustrates a schematic view of a projection assembly (300) according to one exemplary embodiment. As shown in FIG. 3, the projection assembly generally includes a modulator assembly (310), a first projection lens sub-assembly (320) including a first segment (330) and a second segment (340). The projection assembly (300) also includes a second projection lens sub-assembly (350). A virtual modulator (360) is formed between the first projection lens sub-assembly (320) and the second projection lens sub-assembly (350). As introduced, the virtual modulator (360) may provide for flexibility of the design and location of the second projection lens sub-assembly (350). Further, the virtual modulator (360) may also provide for increased contrast ratio, such as by reducing stray light that is directed to the display surface. The stray light may be reduced by use of a field stop (365).

The modulator assembly (310) modulates light directed thereto, such as by an illumination source (120; FIG. 1) to form a sub-image. The output of the modulator assembly (310) is directed to the first segment (330). The first segment focuses the output of the modulator assembly (310) onto a front face of the second segment (340). The front face of the second segment (340) defines a pupil plane (370). The front face controls the amount of light that is transmitted to form the final image. In particular, light incident on the front face is transmitted through the second segment (340), where the light may become part of the final displayed image. Further, light which is not directed to the front face is not transmitted to the rest of the display system. Thus, the front face of the second segment (340) is configured to control how light is directed to the rest of the projection assembly.

As the output of the modulator assembly (310) passes through the second segment (340), the second segment (340) focuses the light at a virtual modulator plane to form the virtual modulator (360). As introduced, the virtual modulator (360) is substantially equivalent to a single modulator panel, which combines the output of the modulator assembly (310) at a single plane. As introduced, a pupil plane (370) is defined at the front face of the second segment (340). Accordingly, the pupil plane (370) reduces the amount of stray light at the virtual modulator (360). In addition, a field stop may be placed around the virtual modulator (360). In particular, the field stop according to one exemplary embodiment is a border or frame with an opening defined therein. Light which is to be transmitted passes through the field stop while light to be blocked is blocked by the field stop. Thus, the field stop creates a dark, virtual border around the image to be displayed. The field stop (365) may be substantially at or adjacent to the virtual modulator (360). The location of the field stop (365) may reduce the amount of stray light that is transmitted to the display surface, and thus provide for a well-formed dark border around the displayed image. Without the virtual modulator, the field stop is often difficult to locate adjacent the various modulator panels within the modulator assembly due to intervening components.

The second projection lens sub-assembly (350) images the virtual modulator (360). According to one exemplary embodiment, the virtual modulator (360) is in direct communication with the second projection lens sub-assembly (350). Thus, the entire path between the virtual modulator (360) and the second projection lens sub-assembly (350) may be substantially free of intervening components. As introduced, such a configuration may allow for design freedom of the second projection lens sub-assembly (350).

For example, the second projection lens sub-assembly (350) may be located at substantially any position relative to the virtual modulator (360). This may in turn allow for design freedom in choosing a focal length for the projection lens sub-assembly. As a result, the virtual modulator (360) may allow for a short throw length for the second projection lens sub-assembly (350) due to the lack of physical limitations which allow the short throw length lens to be adjacent or nearly adjacent to the virtual modulator (360). In particular, according to one exemplary embodiment, the image at the virtual modulator (360) may be pre-corrected for aberrations present in subsequent projection lens sub-assemblies. For example, the first projection lens sub-assembly (320) may be configured to pre-correct aberrations present in the second projection lens assembly (350). As a result, the second projection lens may be located at any distance from the virtual modulator. According to one exemplary embodiment the second projection lens assembly (350) may be located near or adjacent the virtual modulator (360), such that the second projection lens assembly is adjacent or in contact with the field stop (365).

In addition to providing for pre-correction of lens aberrations, the virtual modulator (360) allows the first projection lens assembly to increase or decrease magnifications, to change the shape and/or aspect ratio of the image directed thereto, or to otherwise modify and/or enhance the final projected image. The virtual modulator (360) may be utilized with off-axis and/or on-axis configurations, as will now be discussed in more detail below.

Off-Axis Projection Assembly

Figure 4:
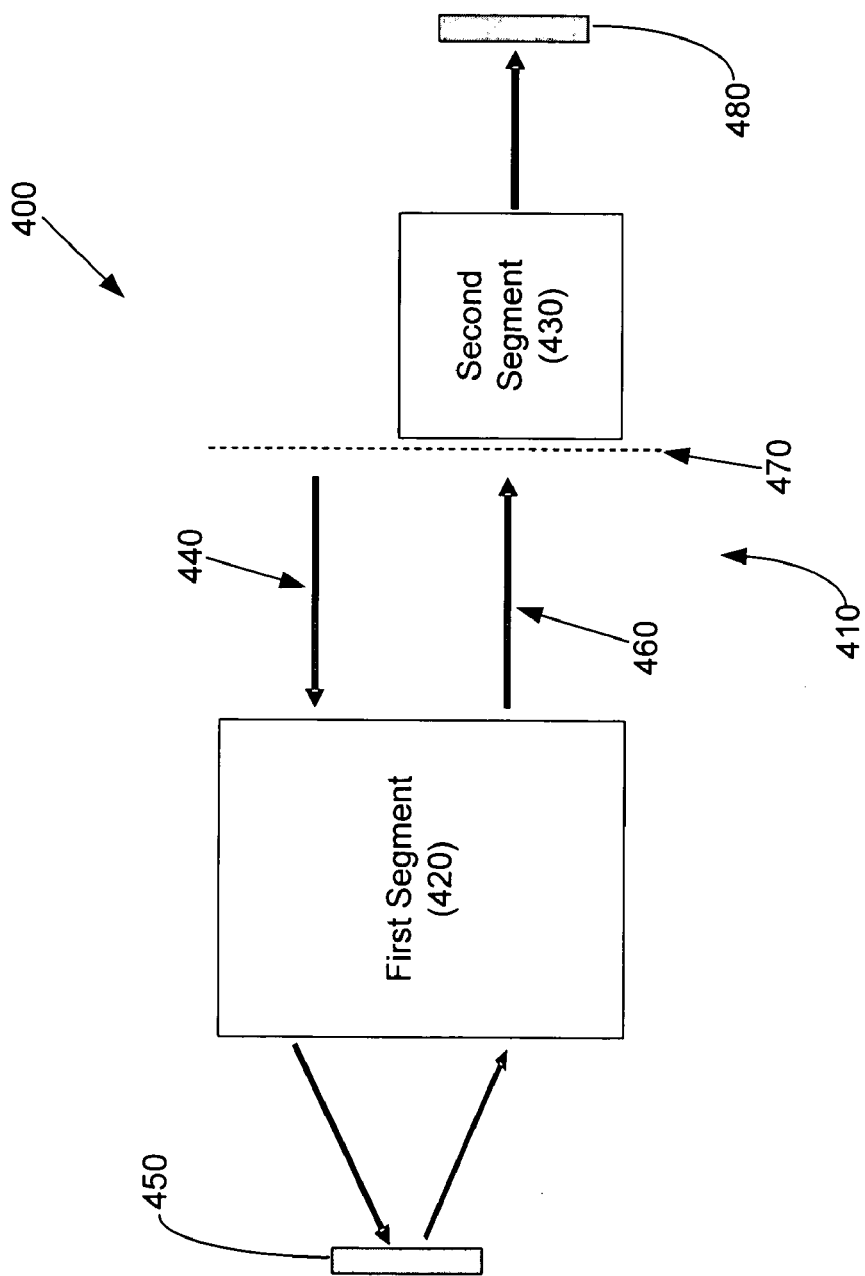
FIG. 4 illustrates a projection assembly according to one exemplary embodiment.

FIG. 4 illustrates an off-axis projection lens assembly (400) according to one exemplary embodiment. The projection lens assembly (400) generally includes a first projection lens sub-assembly (410) including a first segment (420) and a second segment (430). As shown in FIG. 4, light from an illumination source (unmodulated light) (440) is directed to the first segment (420). In particular, the unmodulated light (440) passes through a first portion of the first segment (420). The first segment (420) directs the light to a modulator assembly (450).

The first segment (420) modulates the light incident thereon to produce modulated light (460). The light modulator assembly (450) directs the modulated light back to the first segment (420). More specifically, according to one exemplary embodiment, the modulated light (460) is transmitted through a second portion of the first segment (420). Such a configuration may be generally described as an "off-axis" configuration.

The first segment (420) directs the modulated light (460) to the second segment (430). As previously discussed, a pupil plane (470) is defined at the front face of the second segment (430). Further, as previously discussed, the second segment (430) focuses the light to form the virtual modulator (480) at a virtual modulator plane. Thus, the first and second segments (420, 430) form the virtual modulator that substantially represents the equivalent of the complete modulator assembly focused at the virtual modulator plane. Thereafter, any number of second or final projection lens assemblies may image the virtual modulator (480) and direct a final image to a display surface. Additionally, a virtual modulator may be utilized with other configurations, including, without limitation, a series projection assembly, as will now be discussed in more detail.

Series Projection Assembly

Figure 5:
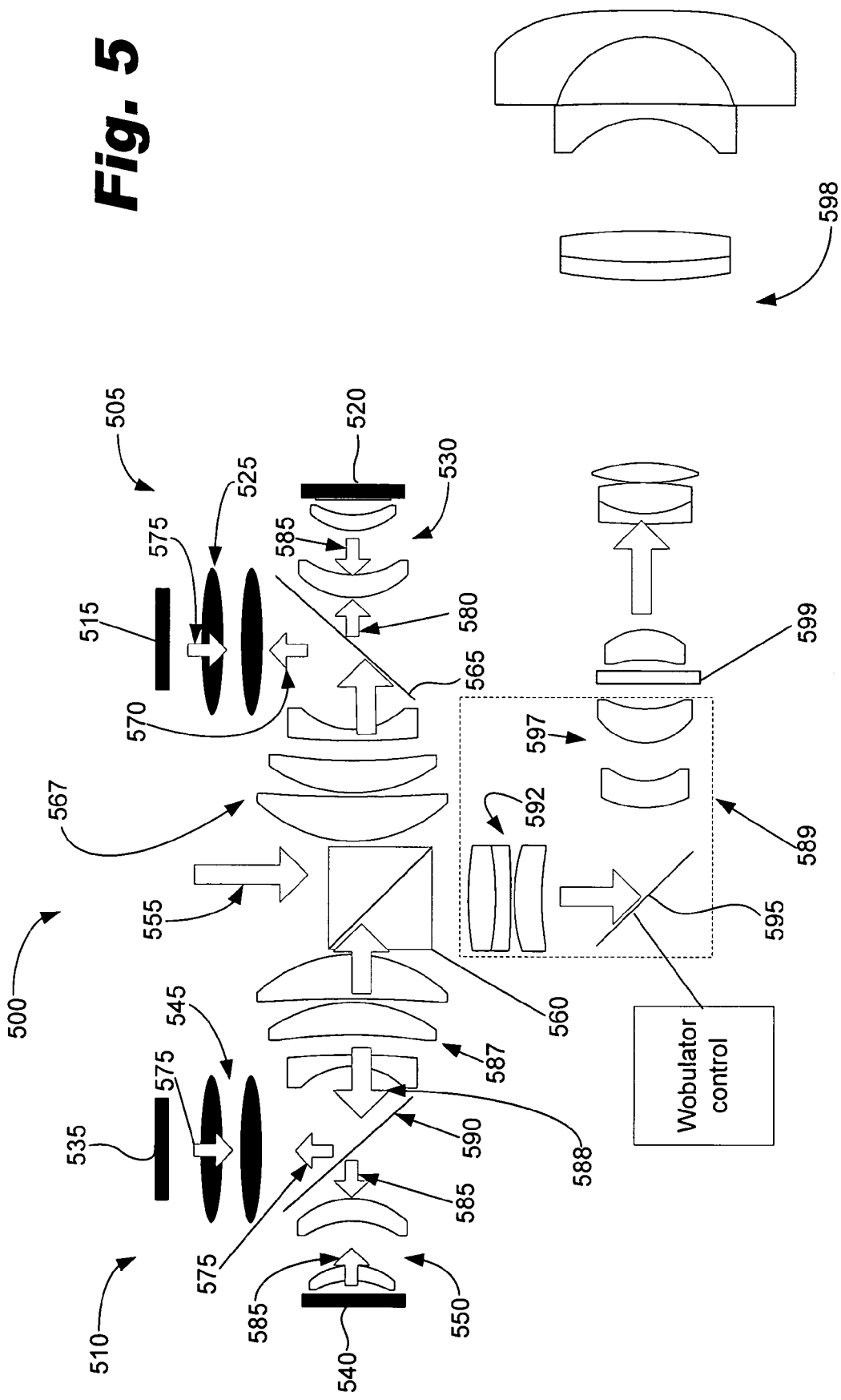
FIG. 5 illustrates a projection assembly according to one exemplary embodiment.

FIG. 5 illustrates an exemplary projection assembly (500) in more detail. This projection assembly (500) forms a virtual modulator at a virtual modulator plane before the image is directed to a display surface by a final projection lens sub-assembly. The projection assembly (500) shown in FIG. 5 includes a first modulator assembly (505) and a second modulator assembly (510) that are placed in an optical series. According to such a configuration, light entering the projection assembly (500) is modulated by the first modulator assembly (505). The light is then directed to the second modulator assembly (510), where it is again modulated. By modulating each image or sub-image in series, the projection assembly (500) may produce an image with enhanced contrast ratio. In particular, the contrast ratio of each modulator assembly is related, at least in part, to the extinction ratio of the pixels in each modulator assembly. The extinction ratio is the ratio of light transmitted by a pixel in a fully activated state relative to the light transmitted by a pixel in a fully-deactivated or off state. By modulating the light more than once, as light is again modulated, a decreased amount of light is transmitted from a pixel in the off state. The decrease of transmitted light from the pixel in the off state increases the extinction ratio and consequently the contrast ratio of the projection assembly (500).

Each modulator assembly (505, 510) includes a plurality of modulator panels. The first modulator assembly (505) includes a first single-color modulator panel, such as a modulator panel (515) and a first two-color modulator panel, such as a blue-green modulator panel (520). For ease of reference, single-color modulator panels and components associated therewith will be discussed as red modulator panels and components, while two-color modulator panels will be discussed as blue-green modulator panels and components. Those of skill in the art will appreciate that other configurations are possible.

According to one exemplary embodiment, first field lenses, such as a first red field lens and a first blue-green field lens (525, 530) are associated with the first red and blue-green modulator panels (515, 520). The second modulator assembly (510) includes a second red modulator panel (535) and a second blue-green modulator panel (540). Second field lenses, such as a second red field lens and a second blue-green field lens (545, 550) are associated with the second red modulator panel (535) and the second blue-green modulator panel (540) respectively. As will be discussed in more detail below, the first and second field lenses (525, 530, 545, 550) may each be independently adjusted to optimize the output of the projection assembly (500). The operation of the projection assembly (500) will now be discussed in more detail.

As seen in FIG. 5, multi-component polarized light, such as linearly polarized white light (555) is directed to a directing member, such as a polarized beam splitter (PBS) (560). For ease of reference, polarized white light of an initial polarization and orientation will be described. Those of skill in the art will appreciate other configurations are possible. The PBS (560) is configured to reflect the initially polarized and oriented white light (555) directed thereto toward the first modulator assembly (505). More specifically, the PBS (560) directs the polarized white light (555) to a first dichroic mirror (565). In particular, the polarized white light (555) passes through a first coupling lens assembly (567). The first coupling lens assembly (567) focuses the polarized white light (555) onto the first dichroic mirror (565).

The first dichroic mirror (565) according to the present exemplary embodiment is configured to reflect a red component beam (570). In particular, according to the present exemplary embodiment, the red component beam (570) is directed through the first red field lens (525). The first red field lens (525) directs the red component beam (570) to the first red modulator panel (515).

The first red modulator panel (515) modulates the red component beam (570) to form a red sub-image (575). According to one exemplary embodiment, the red modulator panel (515) is an interference-type modulator panel. As the red modulator panel (515) modulates the red component beam (570), the red modulator panel (515) changes the polarization of the red sub-image relative to the red component beam (570). In particular, according to one exemplary embodiment, the red modulator panel (515) includes a ¼ wave plate. As the light enters the red modulator panel (515), the ¼ wave plate rotates polarization orientation of the entering light by 45 degrees. The red light is then modulated to form a red sub-image (575). As the red sub-image (575) exits the red modulator panel (515), the ¼ wave plate again rotates the polarization orientation by another 45 degrees, such that the red sub-image (575) has a polarization orientation that is rotated by 90 degrees relative to the red component beam (570).

The red sub-image (575) is then directed back through the first red field lens (525). The focus of the red field lens (525) may be adjusted as desired to minimize color aberrations due to differences in axial color, lateral color, and/or other types of aberrations. The red field lens (525) directs the red sub-image (575) to the first dichroic mirror (565). As introduced, the first dichroic mirror (565) is configured to reflect red light. Thus, the red sub-image (575) is reflected by the first dichroic mirror (565). The red sub-image (575) travels back through the first coupling lens assembly (567) to the PBS (560).

As previously discussed, the PBS (560) is configured to reflect light with the polarization of the initially polarized and oriented white light (555). Also as previously discussed, the red sub-image (575) has a polarization that is rotated 90 degrees relative to the orientation of the white light (555). The orientation of the red sub-image (575) allows the red sub-image (575) to be transmitted through the PBS (560).

As previously discussed, the white light (555) that enters the PBS (560) is initially directed to the first coupling lens assembly (567). The first coupling lens assembly (567) then directs the white light (555) to the first dichroic mirror (565). As discussed, the first dichroic mirror (565) reflects red light. The first dichroic mirror (565) also transmits a blue-green component beam (580). The blue-green component beam (580) is directed to the first blue-green field lens (530).

The blue-green field lens (530) then directs the blue-green component beam (580) to the first blue-green modulator panel (520). The first blue-green modulator panel (520) modulates blue-green light (580) to form a blue-green sub-image (585). According to the present exemplary embodiment, as the blue-green modulator panel (520) modulates blue-green light (580), the first blue-green modulator panel (520) rotates the polarization orientation of the light by 90 degrees. For example, the polarization orientation may be thus rotated by passing the blue-green component beam (580) through a ¼ wave plate as it enters the first blue-green modulator panel (520) to rotate the polarization orientation by 45 degrees.

Thereafter, as the blue-green sub-image (585) exits the first blue-green modulator panel (520), it again passes through the ¼ wave plate. The second pass through the ¼ wave plate rotates the polarization orientation another 45 degrees. As a result, the blue-green sub-image (585) has a polarization orientation that is rotated 90 degrees relative to the blue-green component beam (580).

The blue-green sub-image (585) is then directed back through the first blue green field lens (530). The focus of the blue-green field lens (530) may be independently adjusted to correct aberrations, as previously discussed. The blue-green field lens (530) then directs the light back through the first coupling lens assembly (567) to the PBS (560).

The blue-green sub-image (585) has substantially the same orientation as the red sub-image (575). Accordingly, both the red sub-image (575) and the blue-green sub-image (585) are transmitted through the PBS (560). The combination of the two sub-images may be referred to as a full-color image (588). The PBS (560) transmits the full-color image (588) to a second coupling lens assembly (587).

The second coupling lens assembly (587) then directs the red and blue-green sub-images (575, 585) to the second modulator assembly (510). More specifically, the second coupling lens assembly (587) directs the red and blue-green sub-images (575, 585) to a second dichroic mirror (590). The second dichroic mirror (590) reflects the red sub-image (575) and transmits the blue-green sub-image (585).

The red sub-image (575) is directed to the second red field lens (545). The second red field lens (545) in turn directs the red sub-image (575) to the second red modulator panel (535). The second red modulator panel (535) again modulates the red sub-image (575) to thereby refine it. Further, as the second red modulator panel (535) modulates the red sub-image (575), the second red modulator panel (535) again rotates orientation of the red sub-image 90 degrees, such as through the use of a ¼ wave plate as previously discussed.

The red sub-image (575) is then directed back through the second red field lens (545). The second red field lens (545) may also be independently focused to correct aberrations. Thus, each of the red field lenses (525, 545) may independently direct light to correct aberrations. The second red field lens (545) directs the red sub-image (575) back to the second dichroic mirror (590).

As introduced, the blue-green sub-image (585) is transmitted through the second dichroic mirror (590). The blue-green sub-image (585) is then directed to the second blue-green field lens (550). The second blue-green field lens (550) directs the blue-green sub-image (585) to the second blue-green modulator panel (540).

The second blue-green modulator panel (540) refines the blue-green sub-image (585) while rotating the polarization orientation thereof 90 degrees, such as with a ¼ wave plate as previously discussed. The second blue-green modulator panel (540) then directs the blue-green sub-image (585)

through the second blue-green field lens (550). The second blue-green field lens (550) may also be independently adjusted to correct aberrations.

The blue-green sub-image (585) is transmitted through the second dichroic mirror (590). The transmitted blue-green sub-image (585) and the reflected red sub-image (575) are then again combined into the full-color image (588). The full-color image (588) is then incident on the PBS (560). As discussed, the second red and blue-green modulators (535, 540) rotate the orientation of the light while refining the images. As a result, the full-color image (588) has the same orientation of the white light (555) entering the projection assembly (500). Thus, the PBS (560) reflects the full-color image (588).

The PBS (560) directs the full-color image (588) to a first projection lens sub-assembly (589). The first projection lens sub-assembly (589) includes a first eye-piece lens (592), a directing member, such as a wobbling mirror (595), and a second eye-piece lens (597). The entrance of the first eye-piece lens (592) defines a pupil plane. The pupil plane controls the entrance of stray light to the rest of the projection assembly. The first eye-piece lens (592) directs the full-color image (588) onto the wobbling mirror (595). The wobbling mirror (595) may be coupled to a wobulation control system, which causes the wobbling mirror (595) to selectively spatially shift the path of the full-color image (588) to increase the resolution of the displayed image.

Wobulator control, or wobulation, refers to a process of shifting the position of a light path relative to the wobbling mirror plate (595). In other words, the imaging processing unit (110; FIG. 1) shifts the position of the wobbling polarized plate (595) such that each light from each pixel of each of the modulator panels is displayed in a slightly different spatial position. This concept is discussed in U.S. Published Patent Application 20040028293 filed Aug. 7, 2002, U.S. Publication Application 20040027313, filed Sep. 11, 2002, now U.S. Pat. No. 6,817,722, which are hereby incorporated by reference in their entirety.

The wobbling mirror (595) directs the full-color image (588) to a second eye-piece lens (597). The second eye-piece lens (597) then directs the full-color image (588) to a virtual modulator plane to form the virtual modulator (599). Thus, the optical path within the first projection lens sub-assembly (598) is folded. Such a configuration may allow for wobulation, as previously discussed. Those of skill in the art will appreciate that other components may be coupled to a wobulator control system.

As introduced, the second modulator assembly (510) directs a substantially full-color image (588) through the first and second eye-piece lenses (592, 597). Accordingly, the virtual modulator (599) is substantially equivalent to a single modulator panel having the full combined output of the first and second modulator assemblies (505, 510) located at a single plane. A second projection lens sub-assembly (598) images the virtual modulator (599). According to the present exemplary embodiment, the second projection lens sub-assembly (598) is in direct communication with the virtual modulator (599), such that the optical path therebetween is substantially free of intervening components. The location and characteristics of the second projection lens sub-assembly (598) may then be selected as desired for a particular application. The second projection lens sub-assembly (598) directs the full-color image (588) to a display surface, where the full-color image (588) is displayed.

In conclusion, several projection assemblies are discussed herein for use in display systems. According to several exemplary embodiments, the projection assemblies produce a virtual modulator adjacent to the final projection lens sub-assembly in the projection assembly. The virtual modulator represents the output of the entire projection assembly with substantially similar dimensions as the modulator assemblies within the projection assembly. Such a configuration may allow for substantial design freedom in selecting the characteristics and location of the final projection lens sub-assembly.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the disclosure be defined by the following claims.

What is claimed is:

1. A projection assembly, comprising:
   a modulator assembly, said modulator including at least one modulator panel;
   a projection lens assembly including a first projection lens sub-assembly in optical communication with said modulator assembly, said first projection lens sub-assembly being configured to form a virtual modulator, said virtual modulator corresponding to said output of the modulator assembly focused at a single plane;
   wherein said first projection lens sub-assembly comprises a first segment and a second segment, said second segment providing an optical pupil for a modulated light beam output by said first segment; and
   wherein said second segment corrects chromatic aberration in said modulated light beam caused by said first segment.

2. The assembly of claim 1, wherein said modulator assembly includes a plurality of modulator panels.

3. The assembly of claim 1, and further comprising a plurality of modulator assemblies.

4. The assembly of claim 3, wherein said modulator assemblies are in optical series.

5. The assembly of claim 1, and further comprising a directing mirror located between said first and second segments.

6. The assembly of claim 5, wherein said directing mirror comprises a directing mirror coupled to wobulation control.

7. The assembly of claim 1, wherein said projection assembly comprises an off-axis projection assembly.

8. The assembly of claim 1, wherein said projection assembly comprises an on-axis projection assembly.

9. A projection assembly, comprising:
   a modulator assembly, said modulator including at least one modulator panel;
   a projection lens assembly including a first projection lens sub-assembly in optical communication with said modulator assembly, said first projection lens sub-assembly being configured to form a virtual modulator, said virtual modulator corresponding to said output of the modulator assembly focused at a single plane; and
   a field stop adjacent said virtual modulator.

10. The assembly of claim 1, wherein a directing member is located within said first projection lens sub-assembly, said directing member being coupled to a wobulator control system.

11. A projection assembly, comprising:
   a modulator assembly, said modulator including at least one modulator panel;
   a projection lens assembly including a first projection lens sub-assembly in optical communication with said modulator assembly, said first projection lens sub-assembly being configured to form a virtual modulator, said virtual modulator corresponding to said output of the modulator assembly focused at a single plane;

wherein said virtual modulator has an increased magnification relative to said modulator panel.

12. A projection assembly, comprising:

a modulator assembly, said modulator including at least one modulator panel;

a projection lens assembly including a first projection lens sub-assembly in optical communication with said modulator assembly, said first projection lens sub-assembly being configured to form a virtual modulator, said virtual modulator corresponding to said output of the modulator assembly focused at a single plane;

wherein said virtual modulator has a decreased magnification relative to said modulator panel.

13. A projection assembly, comprising:

a modulator assembly, said modulator including at least one modulator panel; and a projection lens assembly including a first projection lens sub-assembly in optical communication with said modulator assembly, said first projection lens sub-assembly being configured to form a virtual modulator, said virtual modulator corresponding to said output of the modulator assembly focused at a single plane;

wherein said virtual modulator has an aspect ratio different from said modulator panel.

14. The assembly of claim 1, further comprising a second projection lens sub-assembly for projecting an image from said virtual modulator, wherein said first projection lens sub-assembly is configured to pre-correct aberrations caused by said second projection lens sub-assembly.

15. The assembly of claim 14, wherein said second projection lens sub-assembly comprises a short-throw projection lens sub-assembly.

16. A method of modulating light, comprising:

modulating a beam of light said with a light modulator assembly having at least one modulator panel to form at least one image; and directing said beam of light through a projection lens assembly that produces a virtual modulator at a plane within said projection lens assembly;

wherein said virtual modulator has a different magnification or aspect ratio than said modulator panel of said light modulator assembly.

17. The method of claim 16, further comprising splitting said light into multiple component beams, modulating said multi-component beams with a plurality of modulator panels to form multiple images, and combining said images, wherein focusing said light on said virtual modulator plane includes forming a full-color image of a size and shape corresponding to a single, full-color modulator panel corresponding in size and shape to each of said modulator panels.

18. The method of claim 17, and further comprising directing said image to a display surface.

19. The method of claim 17, and further comprising spatially shifting a path of said image.

20. A system, comprising:

means for generating light;

means for modulating said light to form an image;

a final projection lens sub-assembly;

means for forming a virtual modulator from said means for modulating said light in direct communication with said final projection lens sub-assembly; and means for creating a virtual dark border around said image at said virtual modulator.

21. The system of claim 20, and further comprising means for forming an image plane on said means for forming said virtual modulator.

\* \* \* \* \*